United States Patent [19]

Grimm et al.

[11] Patent Number: 4,797,463
[45] Date of Patent: Jan. 10, 1989

[54] TWO-COMPONENT MATERIAL AND THE USE THEREOF

[75] Inventors: Stefan Grimm, Eppelheim; Michael Schatzle, Walldorf; Fritz Stahr, Penzberg, all of Fed. Rep. of Germany

[73] Assignee: Teroson GmbH, Heidelberg, Fed. Rep. of Germany

[21] Appl. No.: 162,442

[22] Filed: Mar. 1, 1988

[51] Int. Cl.$^4$ .............................................. C08G 18/10
[52] U.S. Cl. ....................................... 528/60; 528/65; 528/66
[58] Field of Search ............................. 528/60, 65, 66

[56] References Cited

U.S. PATENT DOCUMENTS 3,923,748  12/1975  Hutt et al. ............................. 528/75

Primary Examiner—Maurice J. Welsh
Attorney, Agent, or Firm—Vincent L. Fabiano; W. W. McDowell, Jr.

[57] ABSTRACT

A two-component material based on curable prepolymers and conventional additives is described which, unlike conventional two-component materials, contains hardenable prepolymer in both individual components, the prepolymer in the first component being a polyurethane prepolymer with free NCO-groups and the prepolymer in the second component is a polymer with free SH-groups. The first component contains curing agent and optionally accelerator for the polymer with free SH-groups and the second component contains curing agent and optionally accelerator for the polyurethane prepolymer with free NCO-groups. Through the use of two prepolymers, the two components of the two-component material can be used in a volume ratio favorable for practical purposes. It is also possible to set the viscosity and density of the two individual components to roughly the same values, so that no problems are caused when mixing the two components. The described two-component materials cure very rapidly and are less sensitive to dosing and mixing errors. In addition, the described two-component materials give high strength values for a given elasticity in the cured state. The described two-component materials are particularly suitable as sealants, adhesives, coating materials and moulding compounds.

6 Claims, No Drawings

TWO-COMPONENT MATERIAL AND THE USE THEREOF

The invention relates to a two-component material based on curable prepolymers and conventional additives.

Chemically curing two-component materials have long been known. In general, the first component of such materials comprises a prepolymer and additives, whilst the second component comprises a curing agent and optionally accelerators, as well as additives. As the curing agent generally comprises either highly reactive, low molecular weight organic compounds or inorganic oxidants, the mixing ratio (parts by weight or volume) is conventionally approximately 10:1, i.e. a considerable excess of the first component is necessary.

The handling of such materials with respect to the mixing, dosing and feed technology belongs to the prior art. However, a more closely matched mixing ratio of the first to the second component and in particular a mixing ratio of 1:1 would be much easier to set, safer to handle and would lead to a better mixing quality (more uniform thorough mixing and therefore distribution of the components).

One-component materials which, after curing, give high-strength, elastic compounds, have also long been known. They cure in air as a result of moisture or oxidation. The curing rate is dependent on the number of reactive groups per volume unit, the nature of the additives and the catalysts. Even in the case of so-called quick-curing systems the curing rate is still too slow for industrial use. High strengths accompanied by high elasticity are dependent on the polymer type, the number of reactive groups per volume unit, the pigment volume concentration and the nature of the additives. Conventionally the polymer content of such one-component materials is above 50%.

Therefore the problem of the present invention is to provide a two-component material which cures rapidly under normal climatic conditions, which has a mixing ratio of an appropriate nature for industrial use and use in work and repair shops and in particular approximately 1:1 parts by volume and a viscosity suitable for problem-free processing, and which not only cures rapidly, but also uniformly and in the cured state has the strength and elasticity of a corresponding, cured one-component material.

According to the invention this problem is solved by a two-component material according to claim 1. Preferred embodiments of the invention can be gathered from the subclaims and the following description. The invention also relates to the use of the inventive two-component material as a sealant, adhesive, coating material and moulding material.

The essential advantages of the inventive two-component material are the rapid curing, the advantageous mixing ratio of in particular approximately 1:1 and the resulting limited sensitivity to dosing errors and the high strength and elasticity in the cured state. In addition, the density and viscosity of the individual components can be set approximately the same according to the invention, which has a favourable influence on the processability of the two-component material and contributes to the sought rapid curing due to the relatively easily attainable homogeneous mixing of the two components. As a result of these properties the inventive two-component material is very suitable for industrial use with short cycle times.

The curing of the prepolymers contained in both components of the inventive two-component material takes place with different curing agents and optionally accelerators. One prepolymer must be inert with respect to the curing agent/accelerator for the other prepolymer, i.e. must not react with the curing agent/accelerator for the other prepolymer. The thus possible use of two different prepolymers permits the use of substantially identical quantities of the first and second components, so that the problems associated with the prior art two-component materials are eliminated.

However, the two different prepolymers not only react with the curing agent present in the other polymer, but also with one another. This gives the additional advantage that the dosing of the curing agent is less critical and less significance is attached to dosing and mixing errors, i.e. they have no or little effect on the cured product.

Inventively suitable polyurethane prepolymers, e.g. polyether and/or polyester urethane prepolymers are known to the expert and are produced by reacting polyols with excess polyisocyanate. Particularly preferred polyurethane prepolymers for the inventive two-component material are reaction products of polyethylenepropylene ether triols

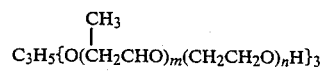

with diisocyanates, particularly 4,4'-diphenyl methane diisocyanate (MDI). The molecular weight of the particularly suitable polyethylenepropylene ether triols is in the range 2,000 to 10,000 and preferably 4,000 to 7,000, the ethylene oxide content preferably being lower than the propylene oxide content and is in particular 5 to 20 and preferably approximately 10% by weight. The viscosity of the preferred polyethylenepropylene ether triols is preferably in the range 800 to 2,000 mPas (25° C.) and in particular 1100 to 1400 mPas.

The polymers suitable for the second component with free SH-groups are also known to the expert and a large selection thereof is commercially available. The prior art polymers preferred by the present invention are those described e.g. in U.S. Pat. No. 3,923,748 (tradename Permapol ®, e.g. P-805) and DE-OS No. 35 08 428 (tradename Baythiol), the disclosure of which is hereby included by reference.

As in the case of the aforementioned one-component materials, the polymer content of the complete mixture in the inventive two-component material is preferably 50% by weight or higher. Thus, in the cured state, the necessary strength characteristics, combined with the sought elasticity are obtained.

The choice and combination of suitable curing agents, accelerators, antiagers, adhesion promoters, plasticizers, fillers and other conventional additives provide no problem for the expert. Thus, the conventionally used organic or inorganic oxidants can be used as the curing agent for the polymer with free SH-groups, preference being given to $MnO_2$. The curing agents for the polyurethane prepolymer with free NCO-groups are conventionally water and/or polyols. The preferred fillers are carbon blacks and uncoated chalks, which must obviously be dried when used in the first component. The antiagers are those conventionally used in polyurethanes, preference being given to mixtures of sterically hindered amine and sterically hindered phenol. The plasticizers for the first component are once again conventional polyurethane plasticizers and preferably phthalates. Examples of plasticizers suitable for the second component are poly-α-methyl styrene, chlorinated paraffins and once again preferably phthalates. Organic metal compounds are suitable as accelerators for both components, preference being given to the salts of ethyl hexanoic acid (octoates).

The two components are produced in the conventional manner for reactive one-component materials, the use of inert gas being advantageous. However, this is well known to the expert, so that further explanations are unnecessary. The two components of the inventive two-component material are mixed together directly prior to use, as is the case with the two-component materials according to the prior art. The mixing ratio (parts by volume) is 0.5:1 to 1.5:1, preferably 0.8:1 to 1.2:1 and in particular approximately 1:1.

In general, within the scope of the invention, components with the compositions given hereinafter have been found to be very advantageously usable (guidance formulations):

| 1st component | |
|---|---|
| PU-prepolymer | 30–70 parts by weight |
| Carbon black | 10–30 parts by weight |
| Chalk | 10–30 parts by weight |
| Plasticizer | 0–30 parts by weight |
| Antiager | 0.2–0.8 parts by weight |
| Curing agent + optionally accelerator | 0.1–1.0 parts by weight |
| 2nd component | |
| SH-terminated polymer | 20–50 parts by weight |
| Carbon black | 10–30 parts by weight |
| Chalk | 10–30 parts by weight |
| Plasticizer | 0–30 parts by weight |
| Antiager | 0.2–0.8 parts by weight |
| Curing agent + optionally accelerator | 0.1–10.0 parts by weight |

Obviously the quantities of the individual constituents of the above guidance formulations are varied in accordance with the intended use.

This can be gathered from the following example, which serves to further illustrate the invention but is not meant to be a limitation on the subject invention.

EXAMPLE

In each case two first and two second components were produced with the compositions given in the following tables.

| 1st component | | | |
|---|---|---|---|
| | A % by weight | | B % by weight |
| PU-prepolymer 1 | 70.0 | PU-prepolymer 2 | 70.0 |
| Carbon black, chalk and antiager | 29.7 | Carbon black, chalk and antiager | 29.7 |
| MnO$_2$ | 0.3 | MnO$_2$ | 0.3 |
| | 100.0 | | 100.0 |

PU-prepolymer 1 = reaction product of a polyethylene-propylene ether triol with 4,4′-diphenyl methane isocyanate.

PU-prepolymer 2 = aromatic isocyanate prepolymer with a NCO-content of approximately 2, an equivalent weight of approximately 2,100 and a viscosity at 23° C. of approximately 30,000 mPa.s.

Antiager = mixture of pentaerythritol-tetrakis- [3-(3,5-ditert.-butyl-4-hydroxy-phenyl)-propionate] (antioxidant) and sterically hindered amine (light stability agent).

| 2nd component | | | |
|---|---|---|---|
| | C % by weight | | D % by weight |
| Prepolymer 3 with SH-groups | 32.50 | Prepolymer 4 with SH-groups | 32.50 |
| Plasticizer, carbon black and chalk | 67.10 | Plasticizer, carbon black and chalk | 67.10 |
| Water | 0.15 | Water | 0.15 |
| Sn-II-octoate | 0.25 | Sn-II-octoate | 0.25 |

Prepolymer 3 = liquid polysulphide corresponding to U.S. Pat. No. 3,923,748 with a density of approximately 1.1 g/cm$^3$, a Brookfield viscosity of approximately 2000 dPa.s and an equivalent weight of approximately 3200.

Prepolymer 4 = aliphatic polymer with terminal mercapto groups with a SH-content of approximately 2%, a viscosity at 23° C. of approximately 60,000 mPa.s and a density at 20° C. of approximately 1.05 g/cm$^3$.

The first component A and second component C were mixed in the volume ratio 1:1, giving a material with the following characteristics:
Processing time: approximately 5 minutes
Shore A hardness development:

| Time after mixing process (h) | Shore A |
|---|---|
| 0.5 | 4 |
| 1.0 | 6 |
| 1.5 | 11 |
| 2.0 | 16 |
| 2.5 | 20 |
| 3.0 | 24 |
| 4.0 | 29 |
| 8.0 | 38 |
| 24.0 | 42 |
| 48.0 | 42 |

Tension shear strength development
Test piece glass/glass + primer; bond: 25 × 8 × 5 mm
Tension rate = 50 mm/min., 23° C., 50% relative atmospheric humidity

| Time after mixing process (h) | N/mm$^2$ |
|---|---|
| 0.5 | 0.1 |
| 1.0 | 0.5 |
| 1.5 | 0.7 |
| 2.0 | 1.0 |
| 24.0 | 4.7 |
| 168.0 | >5.4 |

Tensile strength according to DIN 53504

| Time after mixing process (d) | N/mm$^2$ |
|---|---|
| 1 | >5.4 |
| 2 | >5.6 |
| 7 | >5.6 |

In addition, the first component B and second component D were mixed in the volume ratio 1:1 and a material with the following characteristics was obtained:
Processing time: approximately 30 min.
Shore A hardness development:

| Time after mixing process (h) | Shore A |
|---|---|
| 0.5 | n.m. |
| 1.0 | n.m. |
| 1.5 | 0 |
| 2.0 | 0 |
| 2.5 | 1 |
| 3.0 | 2 |
| 4.0 | 5 |
| 8.0 | 12 |
| 24.0 | 44 |
| 48.0 | 46 |

Tension shear strength at 23° C. (50% relative atmospheric humidity)

| Test piece glass/glass + primer, bond 25 × 8 × 5 mm | 24 h | 4.8 N/mm$^2$ |
|---|---|---|
| Tension rate = 100 mn/min. | 7 d | >5.4 (N/mm$^2$) |
| Tensile strength (23° C./50% r.a.h.) | 24 h | >6.0 (N/mm$^2$) |
| DIN 53504 | 7 d | >6.4 (N/mm$^2$) |

We claim:

1. Two-component material based on curable prepolymers and conventional additives, characterized in that the volume ratio of the first to the second component is 0.5:1 to 1.5:1, both components contain curable prepolymer, the prepolymer in the first component is a polyurethane prepolymer with free NCO-groups, the prepolymer in the second component is a polymer with free SH-groups and the first component contains curing agent for the polymer with free SH-groups and the second component curing agent for the polyurethane prepolymer with the free NCO-groups.

2. Two-component material according to claim 1, characterized in that the volume ratio of the first to the second component is 0.8:1 to 1.2:1.

3. Two-component material according to claim 1, characterized in that the volume ratio of the first to the second component is about 1:1.

4. Two-component material according to claim 1, characterized in that the polyurethane prepolymer is a reaction product of a polyethylenepropylene ether triol with 4,4'-diphenyl methane diisocyanate.

5. Two-component material according to claim 1, characterized in that the first component additionally contains accelerator for the polymer with free SH-groups.

6. Two-component material according to claim 1, characterized in that the second component contains accelerator for the polyurethane prepolymer with free NCO-groups.

* * * * *